(12) United States Patent
Sotzing

(10) Patent No.: US 7,125,479 B2
(45) Date of Patent: *Oct. 24, 2006

(54) POLYMERIC COMPOSITIONS COMPRISING THIENO[3,4-B]THIOPHENE, METHOD OF MAKING, AND USE THEREOF

(75) Inventor: Gregory Allen Sotzing, Storrs, CT (US)

(73) Assignee: The University of Connecticut, Storrs, CT (US)

( * ) Notice: Subject to any disclaimer, the term of this patent is extended or adjusted under 35 U.S.C. 154(b) by 321 days.

This patent is subject to a terminal disclaimer.

(21) Appl. No.: 10/618,262

(22) Filed: Jul. 11, 2003

(65) Prior Publication Data

US 2004/0074779 A1    Apr. 22, 2004

Related U.S. Application Data

(60) Provisional application No. 60/395,183, filed on Jul. 11, 2002.

(51) Int. Cl.
*C25B 3/00* (2006.01)

(52) U.S. Cl. .................. 205/419; 205/424; 205/444

(58) Field of Classification Search ............... 205/419, 205/424, 444
See application file for complete search history.

(56) References Cited

U.S. PATENT DOCUMENTS

| | | | | |
|---|---|---|---|---|
| 4,663,001 A | * | 5/1987 | Lazzaroni et al. | 205/419 |
| 4,910,645 A | * | 3/1990 | Jonas et al. | 361/525 |
| 4,959,430 A | * | 9/1990 | Jonas et al. | 526/257 |
| 4,986,886 A | * | 1/1991 | Wei et al. | 205/419 |
| 5,109,070 A | | 4/1992 | Epstein et al. | 525/189 |
| 5,300,575 A | * | 4/1994 | Jonas et al. | 525/186 |
| 5,691,062 A | | 11/1997 | Shalaby et al. | 428/411.1 |
| 6,194,540 B1 | | 2/2001 | Ito et al. | 528/373 |
| 6,242,561 B1 | | 6/2001 | Mohwald et al. | 528/377 |
| 6,294,245 B1 | | 9/2001 | Roitman et al. | 428/212 |
| 2002/0011420 A1 | | 1/2002 | Roitman et al. | 205/419 |
| 2004/0010115 A1 | | 1/2004 | Sotzing | 528/337 |
| 2005/0124784 A1 | | 6/2005 | Sotzing | |

FOREIGN PATENT DOCUMENTS

| | | |
|---|---|---|
| CA | 2343444 | 3/2000 |
| EP | 0 999 242 A1 | 5/2000 |
| WO | WO 91/06887 | 5/1991 |

OTHER PUBLICATIONS

Neef et al., "Synthesis and Electronic Properties of Poly(2-Phenylthieno[3,4-b]Thiophene: A New Low band Gap Polymer", Chem. Mater., vol. 11 (1999), pp. 1957-1958.*
Lee et al., Synthesis and Characterization of a Soluble and Transparent Conducting Polymer, Poly (3,4-Ethylenedioxythiophene), Mol. Cryst. 1999, vol. 327. pp. 237-240, no month.

A. Bongini, et al., "New n-Dopable Thiophene Based Polymers", Synthetic Metals 101 (1999) pp. 13-14, no month.
J. Eldo, et al., "New Low Band Gap Polymers: Control of Optical and Electronic Properties in near Infrared Absorbing Pi-Conjugated Polysquaraines", Chemistry Materials, 2002, 14, pp. 410-418, no month.
Xiaomin Gu, "Part I: Syntheses and Characterization of Poly (2-Decylthieno[3,4-b]Thiophene), A Low Bandgap Conducting Polymer Part II: Formation and Trapping of Methoxy (Methoxy-Carbonyl) Ketene" Dissertation, Dec., 1995, 182 pages, The University of Texas at Arlington.
B. Lee, et al., "Agueous Phase Polymerization of Thieno[3,4-b] Thiophene", Polymer Preprints 2002, 43(2) pp. 568-569, no month.
K. Lee, et al., "Poly(thieno[3,4-b]thiophene). A New Stable Low Band Gap Conducting Polymer", Macromolecules 2001, 34, pp. 5746-5747, no month.
K. Lee, et al., "Thieno[3,4-b]thiophene as a Novel Low Oxidation Crosslinking Agent", Polymeric Materials: Science and Engineering 2002, 86, p. 195, no month.
K. Lee, et al., "Toward the Use of Poly(Thieno[3,4-b] Thinophene) In Optoelectronic Devices", Polymer Preprints 2002, 43(2) pp. 610-611, no month.
D.C. Loveday, et al., "Synthesis and Characterization of p- and n-Dopable Polymers. Electrochromic Properties of Poly 3-(p-trimethylammoniumphenyl)bithiophene", Synthetic Metals 84 (1997) pp. 245-246, no month.
H. Meng, et al., "A Robust Low Band Gap Processable n-Type Conducting Polymer Based on Poly(Isothianaphthene)", Macromolecules 2001, 34, pp. 1810-1816, no month.
C.J. Neef, et al., "Synthesis and Electronic Properties of Poly(2-phenylthieno[3,4-b]thiophene): A New Low Band Gap Polymer", Chemistry Materials 1999, 11, pp. 1957-1958, no month.
M. Pomerantz, et al., "Poly(2-decylthieno[3,4-b]thiophene-4,6-diyl). A New Low Band Gap Conducting Polymer", Macromolecules 2001, 34, pp. 1817-1822, no month.
V. Seshadri, et al., "Ion Transport Behavior of Polymers and Copolymers Containing Thieno[3,4-b]Thiophene", Polymer Preprints 2002, 43(2), pp. 584-585, no month.
G. A. Sotzing, et al., "Intrinsically Conducting Polymers and Green Chemistry", Polymer Preprints 2002, 43(2), pp. 904-905, no month.
G. A. Sotzing, et al., "Poly(thieno[3,4-b]thiophene) as a Low Band Gap Conducting Polymer and Electrochromic Material", Polymeric Materials: Science & Engineering 2001, 85, pp. 604-605, no month.
G. A. Sotzing, et al., "Preparation and Characterization of Fully Conjugated Intrinsically Conducting Polymer Networks", Polymeric Materials: Science and Engineering 2002, 86, pp. 40-41, no month.

(Continued)

*Primary Examiner*—Edna Wong
(74) *Attorney, Agent, or Firm*—Cantor Colburn LLP

(57) ABSTRACT

Polymers and copolymers comprising repeating units of 5 thieno[3,4-b]thiophene. Water-borne dispersions of such polymers and copolymers can be cast by conventional methods to provide uniform, thin films which possess utility in numerous electroactive applications including electrochromic displays, optically transparent electrodes and antistatic coatings. The compositions of this invention can be doped with conventional p-dopants or n-dopants. The invention also presents an aqueous process for preparing such polymeric compositions.

17 Claims, No Drawings

OTHER PUBLICATIONS

K. Lee, et al., "Synthesis of poly(thieno[3,4-b]thiophene) and its electrochemical characterizations", Polymer Preprints 2001, 42(2), pp. 413-414, no month.

H. Wynberg, et al., "Thieno[3,4-b]Thiophene. The Third Thiophthene", Pergamon Press Ltd, 1967, Tetrahedron Letters No. 9, pp. 761-764, no month.

M. Pomerantz, et al., "Poly(2-decylthieno[3.4-b]thiophene). A New Soluble Low-Bandgap Conducting Polymer", Synthetic Metals 84 (1997), pp. 243-244, no month.

C. J. Neef, et al., "Synthesis and Electronic Properties of Poly(2-Phenylthieno[3,4-b]Thiophene)", Polymer Preprints 1998, 39(1), pp. 147-148, no month.

* cited by examiner ed under reactions conditions
POLYMERIC COMPOSITIONS COMPRISING THIENO[3,4-B]THIOPHENE, METHOD OF MAKING, AND USE THEREOF

CROSS-REFERENCE TO RELATED APPLICATIONS

This application claims the benefit of U.S. Patent Application Ser. No. 60/395,183, filed Jul. 11, 2001, which is incorporated by reference herein in its entirety.

BACKGROUND

This invention relates to polymeric compositions comprising units derived from thieno[3,4-b]thiophene, methods of producing such polymeric compositions, and applications utilizing the compositions.

Intrinsically conducting polymers are of wide utility in applications such as electronic packaging, organic light-emitting diodes (LEDs), electrochromic windows, volatile organic gas sensors, and the like. Intrinsically conducting polymers of particular interest possess a relatively low band gap (Eg), which refers to the energy difference between two electronic energy levels (the conduction band and the valence band). The band gap exhibited by a given polymer depends upon a variety of factors, including the structure of the monomer(s) used to form the polymer. For example, intrinsically conductive polymers formed from thiophene and substituted thiophene monomers are known. Poly (thiophene) has a band gap of 2.1 electron volts (eV), poly(2-decylthieno[3,4-b]thiophene) has a band gap of 0.92 eV, and poly(2-phenylthieno [3,4-b]thiophene) has a band gap of 0.85 eV. Intrinsically conductive polymers comprising polymerized units of thieno[2,3-b]thiophene and thieno [3,2-b]thiophene are also known.

Unfortunately, there are a number of drawbacks associated with many of the intrinsically conducting polymers currently available. The Eg of many polymers is undesirably high, and/or the polymers are not stable. Transparency is difficult to achieve, limiting their use in optical devices. Those consisting solely of aromatic repeat units in the backbone are typically not soluble in water, requiring manufacture and processing in organic solvents.

Of course, replacement of organic solvents with aqueous solvents in the synthesis, use, and processing of intrinsically conductive polymers would be highly desirable from an environmental and cost standpoint. U.S. Pat. No. 5,300,575 discloses dispersions of poly(thiophenes) that are suitable for use as antistatic coatings for plastic moldings. The poly(thiophenes) are prepared by polymerizing a di-substituted thiophene (e.g., 3,4-ethylenedioxythiophene) in the presence of a polyanion and oxidizing agents, oxygen and/or air. The resulting linear polymer is purified using both anion and cation exchange resins wherein poly(styrene sulfonate) serves as a charge compensating dopant. The resulting polymer forms a colloidal dispersion in water, presumably because poly(styrene sulfonate) is soluble in water and demonstrates a strong ionic interaction with the cationic polymeric backbone. The resulting polythiophenes have an Eg of 1.7 eV.

There remains a continuing need in the art, however, for intrinsically conducting polymers that exhibit useful band gaps for industrial applications, that can be readily dispersed in water, and that are stable in solution to afford a useful shelf life.

BRIEF SUMMARY OF THE INVENTION

A polymeric composition having a useful band gap for industrial applications comprises units derived from thieno [3,4-b]thiophene. Such polymeric compositions can be utilized in a variety of industrial applications, including electrochromic displays, optically transparent electrodes, and antistatic coatings.

In another embodiment, an intrinsically conductive polymer comprises polymerized units of thieno[3,4-b]thiophene. In another embodiment, the polymer may further comprise polymerized units of an electroactive monomer. In still another embodiment, the polymer may further comprise polymerized units of a non-electroactive monomer. The polymers may further be doped with conventional p-dopants or n-dopants to modify the electrical properties of such polymers.

A process for the manufacture of a polymeric composition comprising units derived from thieno[3,4-b]thiophene comprises reacting thieno[3,4-b]thiophene in the presence of a solvent, a polyanion, and an oxidant under reactions conditions effective to form the polymeric composition. The polymeric composition produced by this method can advantageously be used to form a film.

In another embodiment, a process for the manufacture of a polymeric composition comprising units derived from thieno[3,4-b]thiophene comprises electrochemical reaction of thieno[3,4-b]thiophene under conditions effective to form the polymeric composition.

DETAILED DESCRIPTION OF THE INVENTION

This invention presents polymeric compositions comprising units derived from thieno[3,4-b]thiophene. Such polymeric compositions have a very low band gap. More particularly, such polymeric compositions include homopolymers, copolymers, and oligomers formed from thieno[3,4-b]thiophene. As used herein, the term "polymeric composition" means a composition having at least five polymerized units derived from thieno[3,4-b]thiophene. Thus, the term polymeric composition is inclusive of homopolymers, polymers, copolymers, and oligomers having at least five polymerized units of thieno[3,4-b]thiophene.

Such polymeric compositions have a very low band gap, on the order of about 0.85 to about 1.09 eV, depending on the method of manufacture. In one advantageous feature, the polymeric compositions can be prepared to exhibit a variety of properties desired for numerous end-use applications. In particular, Applicants have unexpectedly discovered that the compositions can be chemically prepared as solvent-borne, and in particular water-borne dispersions. Such dispersions are easily prepared and readily storable, and use of aqueous dispersions reduces or eliminates environmental problems associated with organic solvents. The solvent-borne dispersions can be cast by conventional methods to provide uniform, thin films that possess utility in numerous applications, including electrochromic displays, optically transparent electrodes, and antistatic coatings.

Without being bound by theory, it is hypothesized that the foregoing advantages arise from branching and/or crosslinking within the polymeric compositions. Such branching and/or crosslinking arises from the unique structure of thieno[3,4-b]thiophene, which possesses three reactive sites alpha to the sulfur atoms (indicated by an asterisk):

Adjustment of reaction parameters allows adjustment in branching and/or crosslinking, which in turn can affect the degree of conjugation and thus the properties of the final composition.

A preferred embodiment is a polymeric composition formed by reaction of thieno[3,4-b]thiophene. A preferred polymeric composition comprises a poly(thieno[3,4-b]thiophene) homopolymer. Another preferred polymeric composition consists of a poly(thieno[3,4-b]thiophene) homopolymer.

In another embodiment, thieno[3,4-b]thiophene is reacted in the presence of one or more additional electroactive monomers and/or non-electroactive monomers to form copolymers, including random copolymers, graft copolymers, block copolymers, and dendritic structures. "Electroactive monomer" as used herein means a monomer or oligomer that is capable of copolymerization with thieno[3,4-b]thiophene, and that imparts or enhances the electrical/electronic properties of the resulting copolymer, including such properties as electrical conductivity, semiconductivity, electroluminescence, electrochromicity, photovoltaic properties, and/or the like. "Non-electroactive monomer" means a monomer that is capable of copolymerization and that either decreases or does not adversely affect the electrical/electronic properties of the resulting copolymer. Preferably, the non-electroactive monomer does not adversely affect the electrical/electronic properties of the resulting copolymer.

Examples of suitable electroactive monomers include those known in the art to exhibit electroactivity, including but not limited to thiophene, substituted thiophenes, substituted thieno[3,4-b]thiophenes, dithieno[3,4-b:3',4'-d]thiophene, bithiophene, pyrrole, substituted pyrroles, phenylene, substituted phenylenes, naphthalene, substituted naphthalenes, biphenyl and terphenyl and their substituted versions, phenylene vinylene, substituted phenylene vinylene, and the like. As used herein "substituted" means replacement of one or more hydrogens with one or more substituents that do not significantly adversely affect polymerization and/or use of the polymer. Suitable substituents include, for example, —H, hydroxyl, $C_6$–$C_{36}$ aryl, $C_3$–$C_6$ cycloalkyl, $C_1$–$C_{12}$ alkyl, halogen (i.e., F, Cl, Br, I), $C_1$–$C_{12}$ alkoxy, $C_1$–$C_{12}$ alkylthio, $C_1$–$C_{12}$ perfluoroalkyl, $C_6$–$C_{36}$perfluoroaryl, pyridyl, cyano, thiocyanato, nitro, amino, $C_1$–$C_{12}$ alkylamino, $C_1$–$C_{12}$ aminoalkyl, acyl, sulfoxyl, sulfonyl, amido, and/or carbamoyl.

Suitable substituted thieno[3,4-b]thiophenes are represented by the formula:

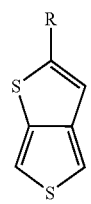

wherein R is $C_1$–$C_{12}$ primary, secondary, or tertiary alkyl, cylcoalkyl, $C_6$–$C_{36}$ aryl, or a functional group such as hydroxyl (—OH), $C_1$–$C_{12}$ alkyl ether, carboxylic acid, $C_1$–$C_{12}$ alkyl carboxylic acid ester, or sulfonic acid (—SO$_3$H). "Aryl" as used in this application means a compound having the ring structure characteristic of benzene, naphthalene, phenanthrene, anthracene, and the like, for example phenyl ($C_6H_5$) or naphthyl ($C_{10}H_7$). The alkyl or aryl group may be unsubstituted or substituted as described above.

Suitable substituted thiophenes include those described in U.S. Pat. No. 4,959,430, for example, and having the formula:

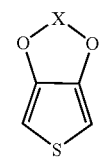

wherein X is $C_1$–$C_4$ alkylene or substituted $C_1$–$C_4$ alkylene. In a preferred embodiment, X is $C_1$–$C_{12}$alkyl- or $C_6$–$C_{12}$ phenyl-substituted ethylene, or a 1,2-cyclohexylene. Optionally, the alkyl or phenyl groups can be further substituted as described above.

Additional suitable substituted thiophenes include those described in U.S. Pat. No. 4,910,645, for example, and having the structure:

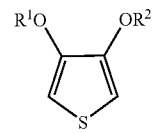

wherein $R_1$ and $R_2$ are each independently —H, $C_1$–$C_4$ alkyl, phenyl, and substituted phenyl.

A preferred type of polymeric composition comprises thieno[3,4-b]thiophene units and/or substituted thieno[3,4-b]thiophene units wherein the end units are substituted with reactive functional groups. Such polymers, preferably oligomers, may be incorporated into block copolymers directly by reaction between the functional groups or with other monomers or oligomers to form copolymeric compositions. Alternatively, the endgroups may be further derivatized with difunctional reactants known in the art (for example, hydroxyl endgroups could be coupled with diisocyanates or molecules containing at least two acid chlorides). The oligomers thus derivatized may then be coupled with each other, or other co-reactive monomers or polymers. Use of such derivatized oligomers in the formation of polymers provides a convenient method for controlling the conjugation length of the polymeric compositions of this invention. The conjugation length in the oligomeric structure can be varied to achieve desired properties for a variety of applications.

The compositions can be conveniently prepared by a variety of methods. A preferred method uses oxidative chemical reaction in a solvent, preferably an aqueous solvent. Such reactions include aqueous phase polymerizations wherein thieno[3,4-b]thiophene, a polyanion, and an oxidant are reacted in the presence of water under reaction conditions effective to form the polymeric composition. It is to be understood that while the process is described below as a homopolymerization, it is also possible to conduct copolymerization by use of a monomer such as the above-described thiophene monomers, 3,4-ethylenedioxythiophene, pyrrole, or the like.

Suitable polyanions include polycarboxylates such as poly(acrylate), poly(methacrylate), and poly(maleate); polymeric sulfonates, such as sulfonated poly(tetrafluoroethylene) (for example NAFION® from Du Pont), sulfonated polystyrenes, and sulfonated polymers of poly(vinyl) polymers; and copolymers of vinyl carboxylic and vinyl sulfonic acids with other monomers, such as acrylates and styrene. The molecular weight of the polymers supplying the polyanions is preferably about 1,000 to about 500,000, more preferably about 2,000 to about 500,000, even more preferably about 5,000 to about 200,000, still more preferably about 50,000 to about 120,000, and most preferably about 70,000. The polyanions are generally obtained by ion exchange of the corresponding polyacids, many of which are commercially available or may be produced by known methods. Suitable counterions are those that do not significantly adversely affect polymerization or use of the polymeric compositions, and include, for example, alkali and alkaline earth metals such as $Li^+$, $Na^+$, $K^+$, and the like.

Suitable oxidants include the iron (III) salts of organic acids, inorganic acids containing organic residues, and inorganic acids, such as $FeCl_3$, $Fe(ClO_4)_3$. Oxidants such as $H_2O_2$, $K_2Cr_2O_7$, alkali or ammonium persulfates, alkali perborates, potassium permanganate, or copper salts such as copper tetrafluoroborate may also be used. In addition iodine, air and oxygen may advantageously be used as oxidants. Persulfates and the iron (III) salts of organic acids and inorganic acids containing organic residues are preferred because they are not corrosive. Examples of suitable iron (III) salts of organic acids are the Fe(III) salts of $C_1$–$C_{30}$ alkyl sulfonic acids, such as methane or dodecane sulfonic acid; aliphatic $C_1$–$C_{20}$ carboxylic acids, such as 2-ethylhexylcarboxylic acid; aliphatic $C_1$–$C_{20}$ perfluorocarboxylic acids, such as trifluoroacetic acid and perfluorooctanoic acid; aliphatic dicarboxylic acids, such as oxalic acid; and aromatic, optionally $C_1$–$C_{20}$ alkyl-substituted sulfonic acids, such as benzenesulfonic acid, p-toluene-sulfonic acid and dodecyl benzenesulfonic acid. Mixtures of the aforementioned Fe(III) salts of organic acids may also be used. Examples of iron (III) salts of inorganic acids containing organic residues are the iron (III) salts of sulfuric acid semiesters of $C_1$–$C_{20}$ alkanols, for example the Fe(III) salt of lauryl sulfate.

The amount of polyanion and oxidant used in the aqueous polymerization method may vary broadly and can be determined for any given polymerization without undue experimentation. For example the weight ratio of thieno[3,4-b]thiophene monomer to polyanion is typically 0.001:1 to 10:1 monomer:polyanion, preferably 0.05:1 to 1.0:1.0 monomer:polyanion. The weight ratio of thieno[3,4-b]thiophene monomer to oxidant is typically 0.01:1 to 10:1, preferably 0.1:1 to 2.0:1, more preferably 0.17:1 to 2.0:1, most preferably 0.25:1 to 0.78:1 monomer:oxidant. Ferric sulfate, for example, is typically present in an amount of 0.1 wt % to 5 wt % of thieno[3,4-b]thiophene.

Suitable solvents for conducting the oxidative chemical reaction do not adversely affect the reaction, and are preferably inert. Suitable solvents are further selected on the basis of economics, environmental factors, and the like, and may be organic, aqueous, or a mixture thereof. Suitable organic solvents may be aliphatic alcohols such as methanol and ethanol; aliphatic ketones such as acetone and methyl ethyl ketone; aliphatic carboxylic esters such as ethyl acetate; aromatic hydrocarbons such as toluene and xylene; aliphatic hydrocarbons such as hexane; aliphatic nitriles such as acetonitrile; chlorinated hydrocarbons such as dichloromethane; aliphatic sulfoxides such as dimethyl sulfoxide; and the like, as well as mixtures comprising at least one of the foregoing organic solvents. Preferably aqueous solvents are used, that is, a solvent comprising water and/or water-miscible organic solvents such as lower alcohols, acetonitrile, tetrahydrofuran, dimethylacetamide, dimethyl formamide, and the like.

The temperature for conducting the polymerization is not critical but can affect the rate of polymerization. Typical reaction conditions include temperatures of 0 to about 50° C. The polymerization is continued for a period of time until the desired degree of polymerization is achieved. The degree of polymerization varies depending upon the end use application, and is readily determined by one of ordinary skill in the art without undue experimentation. The polymerization time may be a few minutes up to about 48 hours, and depends on a number of factors including the size of the reactor utilized in the polymerization, the polymerization temperature, the degree of polymerization, the oxidant utilized in the polymerization process, and the like.

After reaction, the polymeric compositions may be purified by anion exchange chromatography as is known in the art.

Polymeric compositions formed by oxidative chemical reaction are advantageously utilized in the form of dispersions comprising the polymer and an organic or aqueous carrier. It is to be understood that the term "dispersion" as used herein is inclusive of compositions wherein all, none, or a portion of the polymeric composition is fully dissolved in the liquid carrier. Preferably, the polymeric compositions are in the form of small particles that are storage stable, i.e., remain in substantially the same particulate form for at least about 24 hours, more preferably at least about 48 hours, even more preferably at least about one week, and most preferably at least about one month. In an especially preferred embodiment, the liquid carrier is the same as the solvent in which the polymeric compositions are manufactured, preferably water and/or one or more water-miscible organic solvents. Of course, additional solvent may be used to dilute the dispersion if desired. The amount of the polymeric composition in the dispersion may vary depending upon a variety of factors, for example the nature of the solvent, the nature of the polymer, the molecular weight of the polymer, the end-use application, and the like, and is readily determined by one of ordinary skill in the art without undue experimentation, and can vary from 1 to 99% by weight.

Dispersions containing the polymeric compositions can be formed into films by applying the dispersions to a substrate via conventional processes including ink jet printing, screen printing, roll to roll printing processes, spin coating, meniscus and dip coating, spray coating, brush coating, doctor blade application, curtain casting and the like, to form a layer. Suitable substrates are solid materials (flexible or rigid) suitable for deposition of the polymeric compositions, and may be, for example, glass, an organic polymer such as a plastic, silicon, a mineral, a semiconducting material, a ceramic, a metal, and the like, as well as a combination comprising at least one of the foregoing materials. The substrate may be inherently conductive.

Alternatively, the monomeric composition (thieno[3,4-b]thiophene, optional co-monomer(s), polyanion, and oxidant) may be used to form a layer on a substrate, followed by reaction to form the polymeric composition. Each component may be coated separately (i.e., monomer and optional co-monomer, followed by anion followed by oxidant) or simultaneously.

The liquid carrier may be removed from the layer of the dispersion by conventional techniques, to form a film. Removal of the carrier may be effected at room temperature or other temperature that does not adversely affect the properties of the resulting film. However, to obtain higher processing speeds, the film is preferably dried at elevated temperatures.

The electrical conductivity of the films can be readily modified, if necessary, to meet the requirements of a desired application by doping with conventional acidic dopants (p-dopants) or basic dopants (n-dopants) known in the art. p-Dopants are preferred. Suitable p-dopants include mineral acids such as HCl, $HNO_3$, $H_2SO_4$, $H_3PO_4$, HBr, and HI; organic sulfonic acids such as dodecyl benzene sulfonic acid, lauryl sulfonic acid, camphor sulfonic acid, organic acid dyes, methane sulfonic acid, and toluene sulfonic acid; polymeric sulfonic acids such as poly(styrene sulfonic acid) and copolymers of styrene sulfonic acids; carboxylic acids such as adipic acid, azelaic acid, and oxalic acid; and polycarboxylic acids such as poly(acrylic acid) poly(maleic acid), poly(methacrylic acid) and copolymers formed from acrylic acid, maleic acid, and/or methacrylic acid. Conventional mixed dopants comprising one or more of the foregoing, such as a mixture of a mineral acid and an organic acid, can also be used to impart the desired electroactive character to the films. Suitable basic dopants include, but are not limited to Na, K, Li and Ca. Other suitable dopants include $I_2$, $PF_6$, $SbF_6$, and $FeCl_3$. In some instances the oxidant and the dopant may be the same. The dopant is preferably added to the monomeric composition prior to reaction.

Admixtures of the polymeric compositions with other electroactive materials such as laser dyes, other electroactive polymers, hole transport or electron transport materials, including electroactive organometallic compounds, are also within the scope of this invention. Such materials are preferably added to the polymeric composition before or after formation of a dispersion. Additives such as ethylene glycol, diethylene glycol, mannitol, propylene 1,3-glycol, butane 1,4-glycol, N-methyl pyrrolidone, sorbitol, glycerol, propylene carbonate and other appropriate high boiling organics may be added to dispersions of the polymeric compositions to improve conductivity.

Additional additives may also be used, and include conductive fillers such as particulate copper, silver, nickel, aluminum, carbon black and the like; non-conductive fillers such as talc, mica, wollastonite, silica, clay, $TiC_2$, dyes, pigments and the like, to promote specific properties such as increased modulus, surface hardness, surface color and the like; antioxidants; UV stabilizers; viscosity modifiers; and surfactants such as acetylenic diols, surfactants typically being added to control stability, surface tension, and surface wettability.

An alternative method for preparing the polymeric compositions is by electrochemical reaction (oxidation) of a monomeric composition comprising thieno[3,4b]thiophene and an optional copolymer as described above. The concentration of monomer may vary widely, for example from 0.1 to 1 M, and is readily determined by one of ordinary skill in the art.

Conventional electrolytic cells can be used for the reaction. In one embodiment, a three-electrode configuration (working electrode, counter electrode, and reference electrode) in operable communication with an electrolyte is used, comprising a working electrode, preferably a button working electrode selected from the group consisting of platinum, gold and vitreous carbon working electrodes, a platinum flag counter electrode, and an Ag/Ag+non-aqueous reference electrode. Suitable electrolytes include tetraalkylammonium salts, e.g., tetraethylammonium, tetrapropyl ammonium, tetrabutylammonium salts and the like, as well as salts of cations such as lithium. Suitable counter ions include but are not limited inorganic ions such as perchlorate, tetrafluoroborate, hexafluorophosphate, and halides such as chloride, bromide, iodide, and organic anions such as tosylate, triflate, trifluoromethylsulfonimide, polyanions such as the ones listed above (polystyrenesulfonate, the anionic form of acrylic acid, etc.) for the aqueous polymerization. Solvents may be used, for example water, ethanol, methanol, acetonitrile, propylene carbonate, tetraglyme, methylene chloride, chloroform, tetrahydrofuran, and the like. Preferred solvents are water, acetonitrile, and propylene carbonate. A preferred electrolyte is tetrabutylammonium perchlorate/acetonitrile, lithium triflate/acetonitrile and tetrabutylammonium hexafluorophosphate/acetonitrile. The preferred working electrode is a vitreous carbon electrode and the preferred electrolyte is tetrabutylammonium perchlorate/acetonitrile. Thieno[3,4-b]thiophene undergoes electrochemical oxidation at a peak above 0.8 volts (V) to provide the polymeric composition on the surface of the working electrode. The electrochemical oxidation is typically initiated at a potential of about 0.2 V and is substantially completed at a potential of 0.4 V. Upon completion of the polymerization, the polymer can be removed from the working electrode by washing with a solvent such as acetonitrile.

Thieno[3,4-b]thiophene may also be produced using electrochemical reaction, preferably cyclovoltammetric reaction of a composition comprising thieno[3,4-b]thiophene and an optional copolymer in the presence of a polyanion as described above, for example sodium poly(styrene sulfonate). An onset for oxidation is observed at 0.82 V, which corresponds to the potential at which polymerization ensues. Polymerization is indicated by the increase in current response for the lower redox process, which corresponds to the reduction and oxidation of the conducting polymer that has been electroprecipitated onto the electrode surface. After polymerization, the electrode is removed from the electrolyte, washed with brine and then placed into a 0.5M NaCl/$H_2O$ solution.

The polymeric compositions produced by oxidative chemical or electrochemical reaction have a very low band gap. For example, a thin film prepared by oxidative chemical from water has an Eg of 1.09 eV, and a film prepared by electrochemical reaction has an Eg of 0.85 eV, as determined from the onset of pi to pi* transition. In a further advantageous feature, films formed from the polymeric compositions exhibit high optical transparency in their conductive form, i.e., both low color (low absorbance in the visible spectrum) and high transparency. Preferably, a film has a transmissivity of greater than 85%, more preferably greater than about 90%, most preferably greater than about 95%. The polymeric compositions produced by electrochemical oxidation are blue in the reduced form (insulating state) and colorless in the oxidized form (conductive state), making them ideal for electrochromic applications. In general, it has been found that electrochemical reaction produces polymers that are more transparent (lower color and/or greater transmissivity) in the oxidized form than those produced by chemical oxidation.

Films comprising the above-described polymeric compositions can be utilized in a variety of applications, including antistatic coatings, electrically conductive coatings, electrochromic devices, photovoltaic devices, light emitting diodes, flat panel displays, photoimageable circuits, printable circuits, thin film transistor devices, batteries, electrical switches, capacitor coatings, corrosion resistant coatings, electromagnetic shielding, sensors, LED lighting, dimmable mirrors, and the like.

The above-described polymeric compositions are particularly well suited for use in fabricating certain components of light emitting diodes (LEDs). LEDs typically comprise a substrate, and indium tin oxide (ITO) anode, a hole injection layer, a hole transport layer, a light emitting layer, an electron transport layer, an electron injection layer, and a cathode. The p-doped polymeric compositions are particularly suited for replacing the indium tin oxide anode of the LED, and/or as the hole injection layer of the LED. Undoped polymeric compositions of this invention can be utilized in the hole transport layer, the light emitting layer and/or the electron transport layer of the LED.

The above-described polymeric compositions are also particularly well suited for use in fabricating certain components of photovoltaic devices, which are constructed similarly to LEDs. Instead of electrical voltage placed across the device to produce light for the LED device, the input of light (e.g. sunlight) produces a voltage difference across the device to produce an electric current. The devices comprise a light harvesting organic or polymer intermediate layer, with hole transport/electron transport layers optionally placed between the anode and cathode. The polymeric compositions of this invention can be utilized as the anode and hole injection layers (doped) or in the light harvesting layers (undoped).

The polymeric compositions can be utilized in fabricating electrochromic devices that permit or prevent the transmission of light through transparent substrates by application of a voltage across the substrate.

The doped polymeric compositions can be utilized as antistatic coatings. Such coatings may be formed from dispersions in either organic or aqueous carriers. Such antistatic coatings can include admixtures with other polymers, including emulsions, to achieve a balance of conductivity and film properties such as adhesion to the appropriate substrate.

The polymeric compositions can also be used to render an article conductive. In one embodiment, the article is coated with a film of the polymeric composition. In another embodiment, the polymeric compositions may be used as an additive to a composition used to form the article. It is further contemplated that the compositions can be used in electroplating processes, particularly for the manufacture of printable circuits, photoimageable circuits, semiconductor devices and the like.

While the preferred embodiment involves use of the polymeric compositions as transparent/conductive materials, conductive nontransparent coatings based on the compositions of matter of this invention also have utility in specific applications where transparency is not important but electrical conductivity is important. Certain applications such as antistatic coatings may require pigmentation that will result in loss of transparency as well as various conductive paint applications. Printed circuits employing these materials will also generally not require transparency.

The polymeric compositions of this invention can also be utilized to prepare optically transparent conductive coatings for use in optically transparent electrodes, transparent conductive adhesives, stealth coatings, transparent EMF shielding, touch screens, flat screen displays, flat antennas for mobile applications, transparent capacitor plates, and the like.

The following illustrative examples are provided to further describe how to make and use the polymeric compositions and are not intended to limit the scope of the claimed invention. Unless otherwise states, parts and percentages in the examples are given by weight.

EXAMPLE 1

Synthesis of the Thieno[3,4-b]thiophene

All equipment was vacuum dried and argon purged before use. A 1000-milliliter (ml) round bottom, three-necked flask equipped with a thermometer was charged with 450 ml of dry diethyl ether and 34.4 g (133 mmol) of 3-bromo-4-(trimethylsilyl)ethynyl-thiophene. This solution was maintained at a temperature of −78° C. and stirred for an additional 30 minutes, after which 58.6 ml of n-butyl lithium (2.4 M in hexane; 141 mmol) was slowly added drop-wise via syringe over a period of 1 hour while keeping the temperature of the solution below −78° C. After addition, the solution was stirred for 2 hours at −78° C. and then the solution was allowed to warm to about −45° C., which took approximately 1 hour to achieve.

The reaction mixture was allowed to stir for an additional hour while maintaining a temperature of −45° C. Sulfur, 4.5 g (141 mmol), was then added slowly over a ten minute period to the flask via a solids addition funnel and the reaction mixture was allowed to warm to about 3500 in order to fully dissolve the sulfur. After approximately 10 minutes the initially cloudy solution that resulted immediately after sulfur addition had changed to clear and yellow. The reaction mixture was then cooled down to −45° C. and stirring was continued for an additional 2 hours. Then the reaction mixture was slowly warmed to −10° C. over a period of 30 minutes and 250 ml of the reaction mixture was then added to a 500 ml separatory funnel equipped with a cooling jacket containing a brine/ice mixture held at −5° C. It should be noted that the separatory funnel was first charged with 200 ml of brine and cooled to −5° C. before the extraction. During the extraction the aqueous layer changed to a cloudy yellow solution after 30 seconds.

After the first brine wash, the same process was then repeated for the second portion (250 ml) of the reaction mixture with a fresh brine solution (200 ml). The brine layers were then combined, placed in to a single neck 1000 ml round bottom flask under argon and this solution then heated up to 70° C. and stirred for 1 hour at this temperature. After cooling to room temperature, the product Was extracted with ether (4×300 ml) and then the ether layers were combined, dried over $MgSO_4$, and evaporated under vacuum. The crude product (12.8 g) was purified using vacuum distillation with an 11.3 g (61%) thieno[3,4-b]thiophene fraction being collected from 38 to 45° C. at 0.05 torr as a colorless liquid.

EXAMPLE 2

Aqueous Synthesis of Poly(thieno[3,4-b]thiophene)

50 Mg (0.36 mmol) of thieno[3,4-b]thiophene and 418 mg of 30% poly(styrenesulfonic acid) water solution in 9.8 ml of deionized water was added to a 25 ml 1-neck flask. 113.0 mg (0.48 mmol) of $(NH_4S_2O_8$ and 0.9 mg of $Fe_2(SO_4)_3$ were added to reaction flask. The oxidative polymerization was carried out in excess of one hour. After polymerization, the aqueous solution was purified by ion exchange columns (Amberlite IR-120 and IRA-900 from Arcos Organics) resulting in a deep green aqueous polythieno[3,4b]thiophene/poly(styrene sulfonic acid) dispersion. Transparent films were prepared by spin coating the polythieno[3,4-b]thiophene/poly(styrene sulfonic acid) mixture onto glass substrates at 2,300 rpm yielding an electrically conductive surface. The band gap of the polymer was measured as 1.8 eV.

EXAMPLE 3

Electrochemical Synthesis and Characterization of Poly(thieno[3,4-b]thiophene)

Thieno[3,4-b]thiophene was dissolved in tetrabutylammonium perchlorate/acetonitrile (TBAP/CAN) solution to a concentration of 10 mM monomer and was electrochemically polymerized employing a 3-electrode configuration, using a platinum button working electrode (2 mm diameter), platinum flag counter electrode (1 cm$^2$), and a Ag/Ag+ nonaqueous reference electrode (0.473 V versus standard hydrogen electrode as determined by calibration with a ferrocene solution. The monomer exhibits a low oxidation potential with an onset at 0.9V and a peak at 1.05 V. Polymerization was apparent from the current response increase in regular intervals at a lower redox potential upon repetitive scans.

Poly(thieno[3,4-b]thiophene) was further prepared at a constant potential of 1.2 V on an indium tin oxide (ITO) coated glass plate, washed with acetonitrile and cyclic voltammetry was carried out in 0.1 M TBAP/ACN. Upon scanning at a rate of 50 mV/s from −0.8V to 0.8V an onset for oxidation became apparent at −0.5 V with a half wave potential at about 0.2 V. On top of the broad redox process a sharp redox process was present at E1/2 of 0.3 V with 0.18 V peak-to-peak separations. This sharp redox process was not an artifact but was repeatable numerous times for thin films on both platinum and ITO.

Scan rate dependency was carried out at scan rates of 50, 100, 200 and 250 mV/s. The peak current for the reductive process of the polymer was found to scale linearly with the scan rate indicating that poly(thieno[3,4-b]thiophene) was adhered to the surface of the electrode. An about 0.2 micron thick film of poly (thieno [3,4-b]thiophene), as measured by profilometry, was prepared at 1.0 V from a 10 mM monomer/0.1 M TBAP/ACN solution on an ITO coated glass slide. The polymer was reduced at −0.8V, dipped into 0.1 M TBAP/ACN containing 0.2% hydrazine by volume. The onset for the valence to conduction band occurs at 0.85 eV (1459 nm) with a peak at 1.54 eV (804 nm) qualifying this material as a low band gap polymer. The polymer is deep blue in the insulating form and optically transparent in the p-doped state so that it is a potential cathodically coloring material for use in electrochromic devices. Initial chronocoulommetry procedures stepping the polymer between −0.8 V for 20 seconds and 0.6 V for 20 seconds, constituting a double potential step, on a platinum button show the polymer to have no calculable loss of electroactivity upon 200 double potential steps.

Cyclic voltammetry of the polymer was carried out in order to determine the n-doping properties of the polymer and in order to confirm the band gap. Cyclic voltammetry of poly(thieno[3,4-b]thiophene) was obtained using a platinum button working electrode, platinum plate counter electrode, and Ag/Ag+ nonaqueous reference electrode in 0.1 M TBAP/ACN. Sodium hydride was placed in the electrolyte solution in order to ensure the absence of water. The procedure was initiated at a potential of −0.9 V, scanned anodically to 0.6 V, then cathodically toward −1.8V and then anodically to 0.4 V. The p-doping process for the polymer occurs at an onset potential of −0.4 V and peaks at a potential of 0.15 V. The n-doping process ensues with an onset at about 1.05 V and gives two peaks at potentials of −1.3 V and −1.5 V. The difference between the onsets of the p-doping process and the first n-doping process is calculated to be 0.75 eV. The n-doping redox process of the polymer was found to retain 50% electroactivity, as determined by the integration for the n-doping redox process, after the tenth cyclic voltammogram.

The p-doping redox process only becomes intense if the polymer is first cycled through the n-doped state. For instance, without having been subjected to the n-doped state, the polymer peak potential for the oxidative p-doping process occurs at 0.4 V. The first scan after having subjected the polymer to the n-doped state intensifies the current and shifts the p-doping process to a lower potential of about 0.05 V. The polymer oxidation then shifts to a higher potential of 0.15 V upon subjection to a second n-doping process and then becomes stabilized at 0.35 V after having subjected it a third and subsequent times to the n-doping process. The polymer is deep blue in the insulating form and transmissive tan in the p-doped state making it a potential cathodically coloring material for use in electrochromic devices. Initial chronocoulommetry stepping the polymer between −0.8 V for 20 seconds and 0.6V for 20 seconds, (this constitutes a double potential step) were carried out on a 22-platinum button. The polymer was found to have no calculable loss of electroactivity upon 200 double potential steps. The chronocoulommetry results for an about 1 micron thick film on indium tin oxide coated glass were determined with the polymer being switched between −0.8 V and 0.6 V in 0.1 M TBAP/ACN with a pulse length of twenty seconds. It took approximately four seconds for the polymer to switch to the oxidized state and approximately two seconds to switch to the fully reduced state.

EXAMPLE 4

Copolymerization of Thieno[3,4-b]thiophene and 3,4-ethylenedioxythiophene.

A copolymer of thieno[3,4-b]thiophene and 3,4-ethylenedioxythiophene was prepared according to the procedure set forth in Example 3 except that a solution was prepared consisting of 5 mM thieno[3,4-b]thiophene and 5 mM ethylenedioxythiophene in 0.1 M tetrabutylammonium hexafluorophosphate (TBAPF$_6$)/ACN. Polymerization was evidenced by the increase in current of the lower redox process upon sequential scanning. The structure of the copolymer was confirmed by conventional analytical techniques. In addition to polymerizing thieno[3,4-b]thiophene and copolymerizing the same with 3,4-ethylenedioxythiophene, thieno[3,4-b]thiophene was used as a crosslinking agent for the polymerization of 3-octylthiophene using the same general synthesis as set out above.

The essential characteristics of the present invention are described completely in the foregoing disclosure. One skilled in the art can understand the invention and make various modifications without departing from the basic spirit of the invention, and without deviating from the scope and equivalents of the claims, which follow.

What is claimed is:

1. A process comprising electrochemically reacting a monomeric composition comprising thieno[3,4-b]thiophene, to form a polymeric composition comprising units derived from the thieno[3,4-b]thiophene.

2. The process of claim 1, wherein the electrochemical reaction is in an electrocherrmical cell comprising an electrolyte, a working electrode, a counter electrode, and a reference electrode in operable communication.

3. The process of claim 2, wherein to working electrode is a platinum, gold, or vitreous carbon working electrode, and the counter electrode is platinum.

4. The process of claim 3, wherein to working electrode is a vitreous carbon electrode and the electrolyte is tetrabutylammonium perchlorate/acelonitrile.

5. The process of claim 1, wherein the reaction provides the polymeric composition on an indium tin oxide substrate.

6. The process of claim 1, further comprising reducing the polymeric composition.

7. The process of claim 1, wherein the polymeric composition has a band gap of about 0.85 V.

8. The process of claim 7, wherein the polymeric composition is transparent.

9. The process of claim 1, wherein the polymeric composition has no observable color in the oxidized form.

10. The process of claim 1, wherein the monomeric composition further comprises a co-monomer reactive with the thieno[3,4-b]thiophene.

11. The process of claim 10, wherein the co-monomer is a thiophene, substituted thiophene, substituted thieno[3,4-b]thiophene, dithieno[3,4-b:3',4'-d]thiophene, bithiophene, pyrrole, substituted pyrrole, phenylene, substituted phenylene, naphthalene, substituted naphthalene, biphenyl, substituted biphenyl, terphenyl, substituted terphenyl, phenylene vinylene, substituted phenylene vinylene, or a combination comprising at least one of the foregoing co-monomers, wherein the substituents are one or more of —H, hydroxyl, $C_6$–$C_{36}$ aryl, $C_3$–$C_6$ cycloalkyl, $C_1$–$C_{12}$ alkyl, halogen, $C_1$–$C_{12}$ alkoxy, $C_1$–$C_{12}$ alkylthio, $C_1$–$C_{12}$ perfluoroalkyl, $C_6$–$C_{36}$ perfluoroaryl, pyridyl, cyano, thiocyanato, nitro, amino, $C_1$–$C_{12}$ alkylamino, $C_1$–$C_{12}$ aminoalkyl, acyl, sulfoxyl, sulfonyl, amido, and/or carbamoyl.

12. The process of claim 11, wherein the co-monomer is

wherein R is $C_1$–$C_{12}$ primary, secondary or tertiary alkyl, cylcoalkyl, $C_6$–$C_{36}$ aryl, or a functional group.

13. The process of claim 11, wherein the co-monomer is

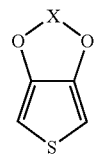

wherein X is $C_1$–$C_4$ alkylene or substituted $C_1$–$C_4$ alkylene.

14. The process of claim 11, wherein the co-monomer is

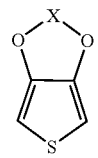

wherein X is $C_1$–$C_{12}$ alkyl- or $C_6$–$C_{12}$ phenyl-substituted ethylene, or a 1,2-cyclohexylene.

15. The process of claim 11, wherein the co-monomer is

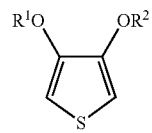

wherein $R^1$ and $R^2$ are each independently —H, $C_1$–$C_4$ alkyl, phenyl, or substituted phenyl.

16. The process of claim 1, wherein the monomeric composition further comprises a polyanion.

17. The process of claim 16, wherein the polyanion is a polycarboxylate or a polymeric sulfonate.

* * * * *